US012675174B2

(12) United States Patent
Wang et al.

(10) Patent No.: US 12,675,174 B2
(45) Date of Patent: Jul. 7, 2026

(54) STYLUS AND ELECTRONIC DEVICE ASSEMBLY

(71) Applicant: Honor Device Co., Ltd., Shenzhen (CN)

(72) Inventors: Hao Wang, Shenzhen (CN); Tengfei Leng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 350 days.

(21) Appl. No.: 18/551,323

(22) PCT Filed: Nov. 3, 2022

(86) PCT No.: PCT/CN2022/129647
§ 371 (c)(1),
(2) Date: Sep. 19, 2023

(87) PCT Pub. No.: WO2023/221412
PCT Pub. Date: Nov. 23, 2023

(65) Prior Publication Data
US 2025/0077000 A1 Mar. 6, 2025

(30) Foreign Application Priority Data

May 20, 2022 (CN) .......................... 202221248702.8

(51) Int. Cl.
*G06F 3/0354* (2013.01)
*G06F 3/038* (2013.01)
*G06F 3/044* (2006.01)

(52) U.S. Cl.
CPC ........ *G06F 3/03545* (2013.01); *G06F 3/0383* (2013.01); *G06F 3/0442* (2019.05); *G06F 3/0446* (2019.05)

(58) Field of Classification Search
CPC .. G06F 3/03545; G06F 3/0383; G06F 3/0442; G06F 3/0446
See application file for complete search history.

(56) References Cited

U.S. PATENT DOCUMENTS 10,268,281 B2 * 4/2019 Yamaguchi ......... G06F 3/03545
11,392,226 B2 7/2022 Zou et al.
(Continued)

FOREIGN PATENT DOCUMENTS

CN 111837095 A 10/2020
CN 214373019 U 10/2021
(Continued)

*Primary Examiner* — Michael Pervan
(74) *Attorney, Agent, or Firm* — Slater Matsil, LLP

(57) ABSTRACT

This application relates to the stylus field, provides a stylus and an electronic device assembly. The stylus includes a main circuit board, a pressure sensing module, and a first flexible printed circuit. The main circuit board includes a pressure sensing chip; the pressure sensing module includes a pressure strain collection element; one end of the first flexible printed circuit is electrically connected to the pressure strain collection element, and the other end of the first flexible printed circuit is electrically connected to the main circuit board for communication between the pressure sensing chip and the pressure strain collection element. The stylus may be further configured to transmit a first coded signal and a second coded signal. The second coded signal of a coding chip is transmitted by using a second flexible printed circuit.

20 Claims, 7 Drawing Sheets

(56)     References Cited

U.S. PATENT DOCUMENTS

| 12,169,601 B2 * | 12/2024 | Peng | G06F 3/0202 |
| 2017/0108953 A1 * | 4/2017 | Mao | G06F 3/03545 |
| 2017/0108956 A1 * | 4/2017 | Tang | G06F 3/03545 |
| 2017/0205902 A1 * | 7/2017 | Yamaguchi | G06F 3/03545 |
| 2022/0026998 A1 | 1/2022 | Zimmerman et al. | |
| 2023/0161425 A1 | 5/2023 | Chen et al. | |

FOREIGN PATENT DOCUMENTS

| CN | 113885716 A | 1/2022 |
| CN | 114063822 A | 2/2022 |
| WO | 2020173390 A1 | 9/2020 |

* cited by examiner

STYLUS AND ELECTRONIC DEVICE ASSEMBLY

CROSS-REFERENCE TO RELATED APPLICATIONS

This application is a national stage of International Application No. PCT/CN2022/129647, filed on Nov. 3, 2022, which claims priority to Chinese Patent Application No. 202221248702.8, filed on May 20, 2022. The disclosures of both of the aforementioned applications are hereby incorporated by reference in their entireties.

TECHNICAL FIELD

This application relates to the field of electronic device accessories, and in particular, to a stylus and an electronic device assembly.

BACKGROUND

A stylus may serve as an input device of some electronic devices (for example, a mobile phone, a tablet computer, and a notebook computer). Some styluses require a pressure sensing system for interaction.

In a known technology, for a stylus, a pressure sensing chip is disposed on a rigid board part of a rigid-flexible board. After being collected by using a strain gauge, pressure or strain is transferred to the pressure sensing chip by using the rigid-flexible board to be converted into a digital signal, and then the digital signal is transmitted to a main circuit board by using a flexible board part of the rigid-flexible board. This causes a problem of a complex structure and relatively high costs.

SUMMARY

This application provides a stylus and an electronic device assembly, to resolve a problem that a pressure sensing signal transferring part of a stylus in a known technology has a complex structure and relatively high costs.

According to a first aspect, an embodiment of this application provides a stylus, including a main circuit board, a pressure sensing module, and a first flexible printed circuit. The main circuit board includes a pressure sensing chip; the pressure sensing module includes a pressure strain collection element; one end of the first flexible printed circuit is electrically connected to the pressure strain collection element, and the other end of the first flexible printed circuit is electrically connected to the main circuit board for communication between the pressure sensing chip and the pressure strain collection element.

In this embodiment of this application, the pressure sensing chip is disposed on the main circuit board, so that the pressure strain collection element can be electrically connected to the pressure sensing chip on the main circuit board by using the first flexible printed circuit, and a pressure sensing signal is transferred to the pressure sensing chip and even the main circuit board for signal processing.

In comparison with this embodiment, a manner used in some known technologies is as follows: A pressure sensing chip is disposed on a rigid board part of a rigid-flexible board; after being collected by using a strain gauge, pressure or strain is transferred to the pressure sensing chip by using the rigid-flexible board to be converted into a digital signal;

and then the digital signal is transmitted to a main circuit board by using a flexible board part of the rigid-flexible board.

Therefore, in comparison with the foregoing known technologies, in this embodiment, the pressure sensing signal can be transmitted by using the first flexible printed circuit, and a relatively high-cost rigid-flexible board does not need to be disposed, thereby reducing product costs.

In a possible implementation, the main circuit board includes a board-to-board connector electrically connected to the pressure sensing chip, and the first flexible printed circuit is connected to the main circuit board by using the board-to-board connector, to implement communication between the pressure strain collection element and the pressure sensing chip.

In this implementation, a connection between the first flexible printed circuit and the main circuit board can be conveniently implemented by using the board-to-board connector.

In a possible implementation, the stylus further includes a stylus tip and a stylus housing; the stylus housing limits internal space; the pressure sensing module further includes a conducting holder, the conducting holder is disposed in the internal space, and the pressure strain collection element is installed on the conducting holder; and the stylus tip is located at an end of the stylus housing in an axial direction and is connected to the conducting holder, and pressure or strain to which the stylus tip is subject can be conducted to the pressure strain collection element by using the conducting holder.

In this implementation, a first coding electrode is disposed on the stylus tip, to facilitate determining of a location of the stylus tip. Structural dispositions of the stylus tip and the conducting holder facilitate conducting the pressure or the strain to the pressure strain collection element.

In a possible implementation, an end of the stylus tip away from the stylus housing is tapered.

In this implementation, the stylus tip is tapered, which facilitates accurate positioning.

In a possible implementation, the conducting holder includes a holder member and a pressure sensing spring sheet; and one end of the holder member is installed with the stylus tip, the other end of the holder member presses the pressure sensing spring sheet against the stylus housing, and the pressure strain collection element is attached to the pressure sensing spring sheet, so that pressure or strain to which the stylus tip is subject can be conducted by using the holder member, and deform the pressure sensing spring sheet, thereby driving deformation of the pressure strain collection element.

In this implementation, the pressure and the strain are transferred to the pressure sensing spring sheet by using the holder member, which facilitates the pressure and the strain to be transferred to the pressure strain collection element and induced by the pressure strain collection element.

In a possible implementation, the pressure sensing spring sheet is U-shaped and includes a bottom sheet, a first side sheet, and a second side sheet; the bottom sheet extends along a first direction, and the first direction is an axial direction of the stylus; and the first side sheet and the second side sheet respectively extend, in a direction perpendicular to the bottom sheet, from two ends of the bottom sheet along the first direction to connect to the stylus housing; the bottom sheet is connected to the holder member through fastening; and the pressure strain collection element is a strain gauge, and the strain gauge is attached to an outer side surface of the pressure sensing spring sheet and covers two sides of a bending corner between the first side sheet and the bottom sheet and/or two sides of a bending corner between the second side sheet and the bottom sheet.

In this implementation, the pressure sensing spring sheet can relatively reliably transfer the pressure or the strain.

In a possible implementation, the holder member includes a support stand and a main shaft part, the support stand is spaced from the main circuit board along a first direction, and the first direction is an axial direction of the stylus; and the main shaft part is connected to an end of the support stand away from the main circuit board and is connected to the stylus tip; the first flexible printed circuit includes a first flexible board part and a second flexible board part, the first flexible board part is attached to and installed on the support stand, and the second flexible board part is led out from the first flexible board part and connected to the main circuit board; and the pressure strain collection element is a strain gauge, and the strain gauge is electrically connected to the main circuit board by using the second flexible board part.

In this implementation, a structural design of the holder member facilitates disposition of the first flexible printed circuit, and a structure is simple and proper.

In a possible implementation, a first coding electrode is disposed at the stylus tip; a coding chip is disposed on the main circuit board, and the coding chip can generate a first coded signal; and the coding chip is electrically connected to the first coding electrode, to transmit the first coded signal to the first coding electrode; the stylus further includes a strip-shaped circuit board; and the strip-shaped circuit board extends along the first direction, one end of the strip-shaped circuit board is electrically connected to the second flexible board part, and the other end of the strip-shaped circuit board extends to the stylus tip and is electrically connected to the first coding electrode, to transmit the first coded signal.

In this implementation, the first coded signal can be conveniently transmitted in the axial direction by using the strip-shaped circuit board.

In a possible implementation, the main shaft part has a shaft hole penetrating along the first direction; and a part of the strip-shaped circuit board is accommodated in the shaft hole, and a part of the strip-shaped circuit board extends out of the shaft hole, is supported on the support stand, and is electrically connected to the second flexible board part.

In this implementation, the shaft hole is disposed on the main shaft part to accommodate the strip-shaped circuit board, and therefore, a structure is compact and proper.

In a possible implementation, the main shaft part includes a first shaft part and a second shaft part; the first shaft part is of a hollow cylindrical structure, and is integrally formed with the support stand; and the strip-shaped circuit board penetrates the first shaft part; and one end of the second shaft part is filled inside the first shaft part, the other end of the second shaft part extends out of the first shaft part along the first direction to a side away from the support stand, and the second shaft part wraps a part of the strip-shaped circuit board.

In this implementation, the strip-shaped circuit board is wrapped by using the second shaft part, improving bending rigidity of the strip-shaped circuit board.

In a possible implementation, the stylus further includes a reinforcing strip, and the reinforcing strip is connected to the strip-shaped circuit board through fastening and is wrapped in the second shaft part.

In this implementation, the reinforcing strip further improves bending rigidity of the strip-shaped circuit board.

In a possible implementation, the stylus further includes a pogo pin; the pogo pin is supported between the first coding electrode and the main shaft part; and the pogo pin is electrically connected to the first coding electrode and the strip-shaped circuit board, to transmit the first coded signal.

In this implementation, the pogo pin is disposed between the first coding electrode and the main shaft part, which increases buffers, and can maintain an electrical connection between the first coding electrode and the strip-shaped circuit board.

In a possible implementation, the support stand has a first end and a second end that are opposite to each other along the first direction; the first end is close to the main circuit board, and the second end is away from the main circuit board; the support stand has a first side and a second side that are opposite to each other along a second direction, and the support stand has a first surface and a second surface that are opposite to each other along a third direction; and the second direction is perpendicular to the first direction, and the third direction is perpendicular to the first direction and perpendicular to the second direction.

In this implementation, a proper design of the support stand facilitates installing structures such as the first flexible printed circuit.

In a possible implementation, the first flexible board part is plate-like, and is stacked on the first surface; and the second flexible board part is plate-like, the second flexible board part is located on the first side of the support stand, a board surface of the first flexible board part is parallel to a board surface of the main circuit board, and a board surface of the second flexible board part is perpendicular to the board surface of the main circuit board.

In this implementation, the first flexible board part and the second flexible board part are respectively disposed on two sides, so that mutual interference between the second coded signal and the first coded signal/the pressure sensing signal can be reduced.

In a possible implementation, the board surface of the second flexible board part is in a wave shape.

In this implementation, the board surface of the second flexible board part is in the wave shape, which has a specific axial stretching ability, and can adapt to a relative location deviation between the main circuit board and the support stand.

In a possible implementation, the second flexible board part has a first conductive circuit and a second conductive circuit; the first conductive circuit is configured to transmit the first coded signal, the second conductive circuit is configured to transmit a pressure sensing signal, and the pressure sensing signal is an analog electrical signal generated by the strain gauge under an action of pressure or strain from the stylus tip; and the first conductive circuit and the second conductive circuit are spaced from each other along a width direction of the second flexible board part, and the width direction of the second flexible board part is perpendicular to an extension direction of the second flexible board part.

In this implementation, the two conductive circuits are spaced from each other, which can reduce mutual interference between the two conductive circuits.

In a possible implementation, the stylus further includes a second coding electrode, and the coding chip can generate a second coded signal; the second coding electrode is spaced from the first coding electrode; and the stylus further includes a second flexible printed circuit; the second coding electrode is electrically connected to the coding chip by using the second flexible printed circuit; and the second flexible circuit is located on the second side of the support stand.

In this implementation, the second flexible printed circuit is disposed on the second side, the second flexible printed circuit is disposed on the first side, and the two flexible printed circuits are respectively disposed on two sides, reducing mutual interference between signals transferred on the two flexible printed circuits.

In a possible implementation, the stylus further includes a first coding electrode; and a coding chip is disposed on the main circuit board, and the coding chip can generate a first coded signal; and the coding chip is electrically connected to the first coding electrode, to transmit the first coded signal to the first coding electrode.

In this implementation, the first coded signal can be reflected by using the coding chip and the first coding electrode, to interact with a matched electronic device.

In a possible implementation, the stylus further includes a second coding electrode, and the second coding electrode is spaced from the first coding electrode; and the coding chip can generate a second coded signal; and the coding chip is electrically connected to the second coding electrode, to transmit the second coded signal to the second coding electrode.

In this implementation, the second coded signal can be reflected by using the coding chip and the second coding electrode, to interact with a matched electronic device.

In a possible implementation, the stylus further includes a second flexible printed circuit; and the second coding electrode is electrically connected to the coding chip by using the second flexible printed circuit.

In this implementation, the second coded signal is transmitted by using the second flexible printed circuit, which avoids a problem of mutual interference between signals caused by transmitting a plurality of coded signals or pressure sensing signals by using close lines in some known technologies, and implementation costs are relatively low.

In a possible implementation, the stylus further includes an isolation electrode, and the isolation electrode is grounded; and the isolation electrode is located between the second coding electrode and the first coding electrode.

In this implementation, the disposed isolation electrode can separate the first coded signal and the second coded signal, reduce mutual interference between the first coded signal and the second coded signal, and prevent the electronic device from incorrectly determining locations of the first coding electrode and the second coding electrode.

In a possible implementation, the second flexible printed circuit and the first flexible printed circuit are two mutually independent flexible printed circuits, or are two parts of one flexible printed circuit.

In this implementation, the second flexible printed circuit and the first flexible printed circuit are independent of each other, which facilitates setting a space between the two and improves anti-interference capabilities of the two; or the second flexible printed circuit and the first flexible printed circuit are two parts of one flexible printed circuit, reducing a quantity of parts.

According to a second aspect, an embodiment of this application provides an electronic device assembly, including an electronic device and a stylus. The electronic device includes a touchscreen, and the stylus is the foregoing stylus. The stylus is coupled to the touchscreen and is used as an input device for the electronic device.

The electronic device assembly in this embodiment of this application can implement interaction between the stylus and the electronic device, and uses the foregoing stylus, having a beneficial effect of relatively low costs.

In a possible implementation, the electronic device is a tablet computer, and an electrode distributed on a surface is disposed on the touchscreen. The stylus has a coding electrode, and the coding electrode of the stylus can cooperate with the electrode distributed on the surface of the electronic device to form a capacitor.

In this implementation, the stylus can interact with the tablet computer, and is used as an input device of the tablet computer, so that the stylus is easy to use.

BRIEF DESCRIPTION OF THE DRAWINGS

To describe the technical solutions in embodiments of this application more clearly, the following briefly describes the accompanying drawings in the embodiments. It should be understood that, the accompanying drawings below only show some embodiments of this application, and thus should not be considered as limitations on the scope. A person of ordinary skill in the art may still derive other related drawings from the accompanying drawings without creative efforts.

DESCRIPTION OF REFERENCE NUMERALS OF MAIN ELEMENTS

Figure 1:
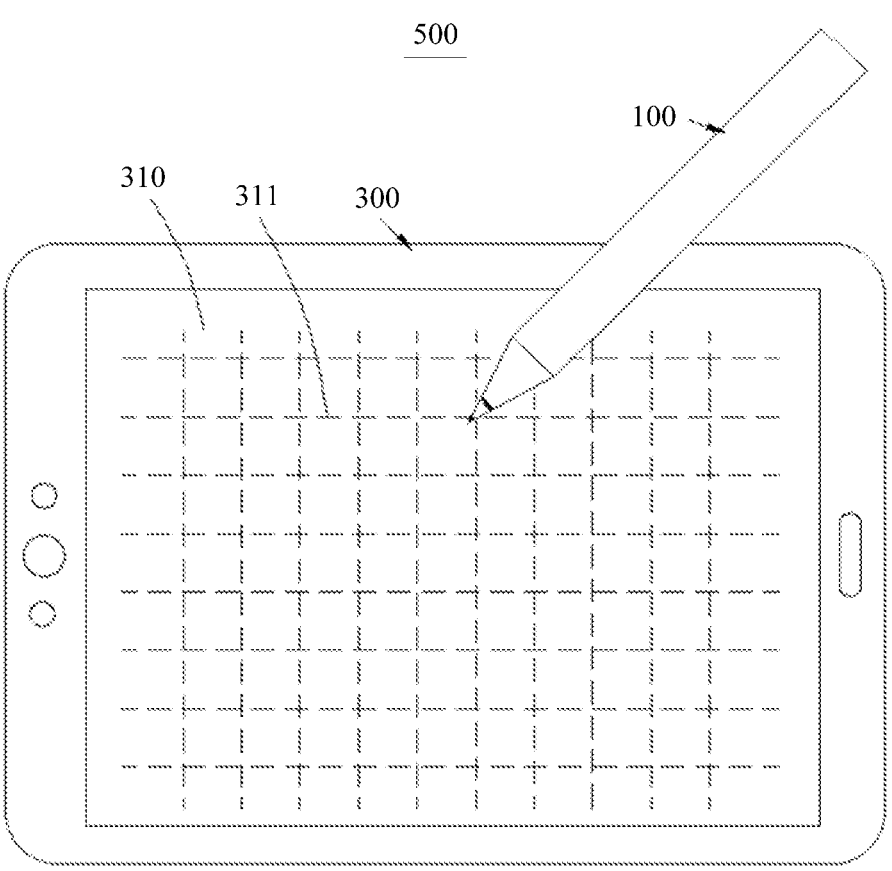
FIG. 1 is a schematic diagram of an electronic device assembly according to an embodiment of this application.

Electronic device assembly 500
Electronic device 300
Touchscreen 310
Electrode 311
Stylus 100
Coding electrodes 101*a* and 101*b*
Main circuit board 10
Pressure sensing chip 10*a*
Board-to-board connector 10*b*
Coding chip 10*c*
First flexible printed circuit 11
Pressure sensing module 12
Pressure strain collection element 13
Strain gauge 13*a*
Conducting holder 14
Stylus housing 15
Stylus tip 16
Strip-shaped circuit board 17
Pressure sensing spring sheet 18
Holder member 19
First flexible board part 20
Second flexible board part 21
First coding electrode 22
Second coding electrode 23
Isolation electrode 24
Pogo pin 25

First conductive circuit 26
Second conductive circuit 27
Second flexible printed circuit 28
Ground contact point 29
Support stand 30
Main shaft part 31
First shaft part 32
Second shaftpart 33
Reinforcing strip 34
Conduction metal 35
Bottom sheet 36
First side sheet 37
Second side sheet 38
First end D1
Second end D2
Communication hole K1
Shaft hole K2
Via hole K3
Central axis L1
Boundary L2
First side M1
Second side M2
Screw N1
First surface P1
Second surface P2
Internal space Q1
First direction X
Second direction Y
Third direction Z

DETAILED DESCRIPTION OF ILLUSTRATIVE EMBODIMENTS

The following clearly describes the technical solutions in embodiments of this application with reference to the accompanying drawings in the embodiments of this application. It is clear that the described embodiments are only some but not all of the embodiments of this application.

It should be noted that when a component is referred to as being "fastened to" another component, the component may be directly fastened to the another component, or there may be a component between the component and the another component. When a component is considered as being "connected to" another component, the component may be directly connected to the another component, or there may be a component between the component and the another component. When a component is considered as being "disposed on" another component, the component may be directly disposed on the another component, or there may be a component between the component and the another component. The terms "perpendicular", "horizontal", "left", "right", and other similar expressions as used in this specification are for illustration only.

Unless otherwise defined, meanings of all technical and scientific terms used in this specification are the same as those usually understood by a person skilled in the art to which this application belongs. The terms used herein in this specification of this application are merely intended to describe specific implementations but not intended to limit this application. The term "or/and" used in this specification includes any or all combinations of one or more related listed items.

Some implementations of this application are described in detail. In absence of conflicts, the following implementations and features in the implementations may be combined.

FIG. 1 shows an electronic device assembly 500. The electronic device assembly 500 includes an electronic device

300 and a stylus 100. The electronic device 300 may be a device that has a touchscreen 310, such as a mobile phone, a tablet computer, a notebook computer, or an industrial control screen device.

The stylus 100 is coupled to the touchscreen 310, that is, the stylus 100 can be induced by the touchscreen 310 and/or send a signal to the touchscreen 310.

The touchscreen 310 may be coupled to the stylus 100 in a plurality of manners. For example, as shown in FIG. 1, the touchscreen 310 uses a capacitive screen and has an electrode 311 distributed on a surface. When the stylus 100 approaches or is connected to the touchscreen 310, a part of the stylus 100 approaching to or being in contact with the touchscreen 310 (for example, a stylus tip) forms a capacitor with the electrode 311 near a location corresponding to the touchscreen 310. By detecting a location, a capacitance, and the like of the capacitor, the electronic device 300 may determine information such as a location and an inclination angle of the stylus 100, and may further determine a signal to be input by a user. A correspondence between different locations and/or capacitances of the capacitor and information such as locations/inclination angles of the stylus 100 may be obtained in an analog manner and pre-stored in the electronic device 300. A correspondence between information such as a location/an inclination angle of the stylus 100 and a signal to be input by the user may be predefined and stored in a storage unit of the electronic device.

Alternatively, after the capacitor is formed between the stylus 100 and the electrode 311 of the touchscreen 310, the stylus 100 transmits a coded signal (for example, a square wave signal of >20 Vp-p), and the touchscreen 310 can receive the signal, to position a location of the stylus 100.

Figure 2:
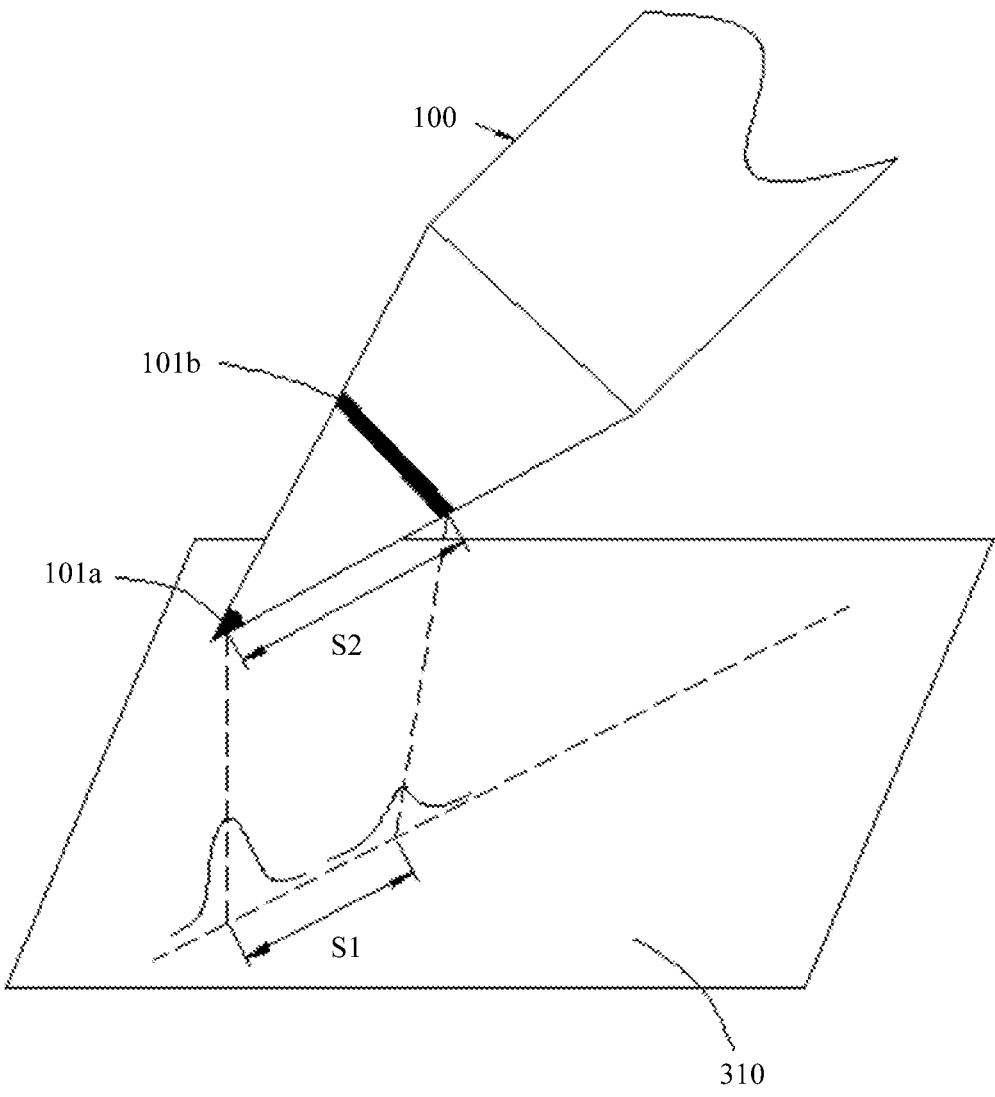
FIG. 2 is a schematic diagram of a principle of detecting an inclination angle of a stylus by an electronic device assembly in FIG. 1.

Referring to FIG. 2, when required, two spaced coding electrodes 101a and 101b may be disposed on the stylus 100, and the touchscreen 310 may calculate an included angle between the stylus 100 and the touchscreen 310 by inducting locations of the two coding electrodes 101a and 101b. A calculation manner of the included angle may be as follows: A space s1 between projections of the two coding electrodes 101a and 101b on the touchscreen 310 is calculated. In this case, an angle A1 between the stylus 100 and the touchscreen 310 meets: $\cos A1 = s1/s2$, where s2 is a space between the two coding electrodes 101a and 101b on the stylus 100.

When required, a pressure sensor (not shown in the figure) may be further disposed on the stylus 100, and is configured to obtain a pressure signal between the stylus 100 and the touchscreen 310. The pressure signal may be transmitted to the electronic device 300 by using the coding electrode 101a or the coding electrode 101b of the stylus 100.

The electronic device 300 may predefine, based on obtained signals such as a location, an inclination angle, and pressure of the stylus 100, a plurality of different input manners, for example, tapping, drawing a line, and calling out a menu.

For example, when the stylus 100 is used to draw on the touchscreen 310, a pressure value corresponds to a thickness or the like of a drawn line.

For another example, when the stylus 100 is used to replace a mouse to perform a click operation, a click is defined as an input manner such as a left-click, a right-click, or a double-click by using pressure, duration, or an inclination angle of the click.

In addition to the foregoing example manner, any other proper interaction manner may be used for interaction between the stylus 100 and the electronic device 300.

FIG. 3-FIG. 6 show an example stylus 100 according to this application, which may be used as an input device of an electronic device 300 (for example, a tablet computer).

Figure 3:
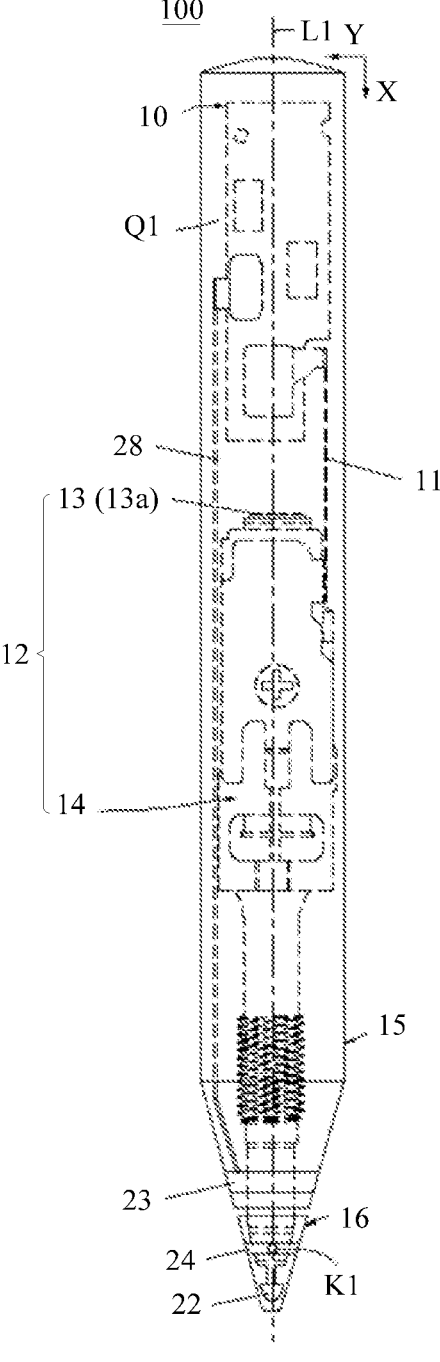
FIG. 3 is a schematic diagram of a structure of a stylus according to an embodiment of this application.
Figure 4:
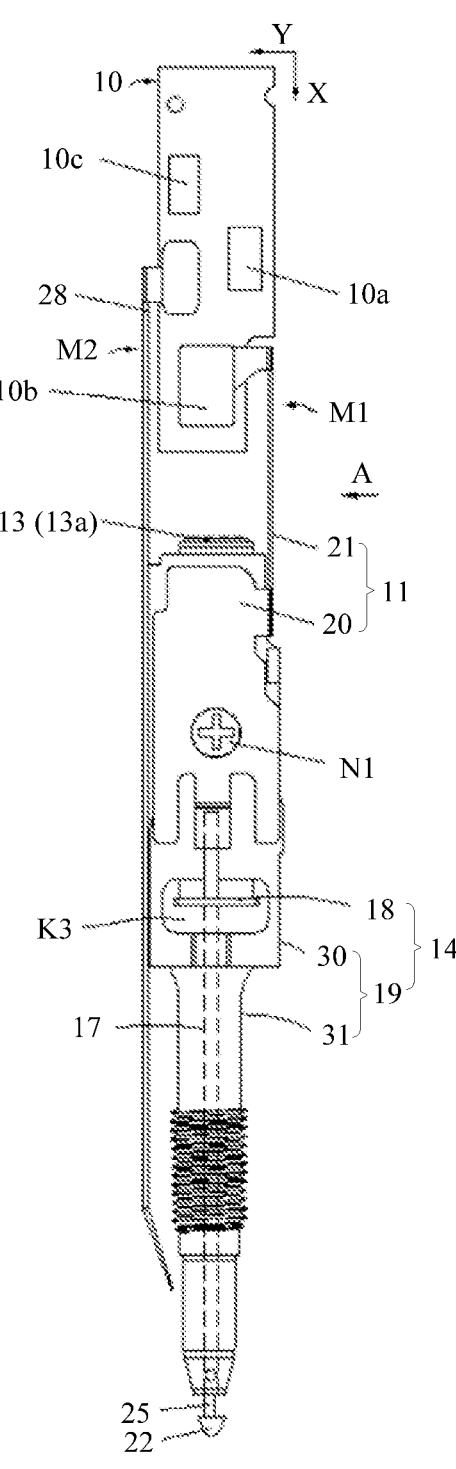
FIG. 4 is a schematic diagram of an internal structure of a stylus in FIG. 3.

Referring to FIG. 3 and FIG. 4, the stylus 100 includes a stylus housing 15, a stylus tip 16, a main circuit board 10, a first flexible printed circuit 11, and a pressure sensing module 12. The stylus housing 15 defines internal space Q1, and the main circuit board 10, the first flexible printed circuit 11, and the pressure sensing module 12 are installed in the internal space Q1 of the stylus housing 15. The stylus tip 16 is located at an end part of the stylus housing 15 and is connected to the pressure sensing module 12.

During use, a user holds the stylus housing 15 by hand, and presses the stylus tip 16 onto the touchscreen 310 (referring to FIG. 1). The pressure sensing module 12 receives pressure or strain to which the stylus tip 16 is subject, converts the pressure or the strain into an analog electrical signal, and transmits the analog electrical signal to the main circuit board 10 by using the first flexible printed circuit 11.

The main circuit board 10 may include a printed circuit board (Printed Circuit Board, PCB), for example, a phenol paper laminate, an epoxy paper laminate, a polyester glass felt laminate, an epoxy glass cloth laminate, or a base material using another material, an electric element (for example, a capacitor, a resistor or a chip) and a conductive circuit are disposed on the printed circuit board, and the main circuit board 10 may be a single-sided board, a double-sided board, or a multilayer board.

In this embodiment, the main circuit board 10 includes a pressure sensing chip 10a. The pressure sensing chip 10a described in this embodiment is a chip configured to receive and process an analog electrical signal from a pressure sensing element such as a strain gauge. For example, the pressure sensing chip 10a may receive the analog electrical signal of the strain gauge, convert the analog electrical signal into a digital signal, and transmit the digital signal to a microcontroller unit (Microcontroller Unit, MCU, which is not shown in the figure) of the main circuit board for processing. The microcontroller unit may process (for example, amplify) the signal or use the signal (for example, wirelessly transmit the signal to the electronic device) independently or in cooperation with another functional module on the main circuit board 10 (for example, a wireless module).

The pressure sensing chip 10a in this embodiment is disposed on the main circuit board 10. For example, a pad (not shown in the figure) configured to fasten each pin (not shown in the figure) of the pressure sensing chip 10a is disposed on the main circuit board 10, and the pressure sensing chip 10a is integrated into the main circuit board 10 through welding connection between the pin of the pressure sensing chip 10a and the pad on the main circuit board 10.

The pressure sensing module 12 includes a pressure strain collection element 13. The pressure strain collection element 13 may be a strain gauge 13a, and can convert induced pressure or strain into an analog electrical signal. For example, the stylus tip 16 of the stylus 100 abuts against the pressure strain collection element 13 by using a structure that can conduct pressure or strain. In this way, when the user holds the stylus housing 15 by hand and presses the stylus tip 16 of the stylus 100 onto the touchscreen 310, the pressure or the strain to which the stylus tip is subject may be conducted to the pressure strain collection element 13 by using the structure, and is perceived by the pressure strain collection element 13. The first flexible printed circuit 11 includes a flexible printed circuit (Flexible Printed Circuit, FPC), which uses polyimide, a polyester film, or another flexible material as a base material, and a conductive circuit laid on the flexible printed circuit, and has a relatively good deformation capability.

The pressure strain collection element 13 is electrically connected to the pressure sensing chip 10a by using the first flexible printed circuit 11. A manner in which the first flexible printed circuit 11 is connected to the pressure sensing chip 10a may be as follows: A board-to-board (Board to board, BTB) connector 10b electrically connected to the pressure sensing chip 10a is disposed on the main circuit board 10. The first flexible printed circuit 11 is connected to the main circuit board 10 by using the board-to-board connector 10b, and communicates with the pressure sensing chip 10a by using a conducted circuit on the main circuit board 10. The pressure sensing chip 10a is disposed on the main circuit board 10, so that the pressure strain collection element 13 can be electrically connected to the pressure sensing chip 10a on the main circuit board 10 by using the first flexible printed circuit 11, and a pressure sensing signal is transferred to the pressure sensing chip 10a and even the main circuit board 10 for signal processing.

In some known technologies, a pressure sensing chip is disposed, and the pressure sensing chip is disposed on a rigid board part of a rigid-flexible board. After being collected by using the strain gauge, a pressure sensing signal is transferred to the pressure sensing chip by using the rigid-flexible board to be converted into a digital signal, and then the digital signal is transmitted to the main circuit board by using a flexible board part of the rigid-flexible board. The known technique increases overall costs of the stylus due to high manufacturing costs of the rigid-flexible board itself.

In comparison with the foregoing known technology, in this embodiment, transmission of the pressure sensing signal can be implemented by using a flexible printed circuit (namely, the first flexible printed circuit 11), and there is no need to dispose the rigid-flexible board with relatively high costs, which reduces overall costs of the stylus 100.

For the stylus 100 in this embodiment, when the stylus 100 interacts with the electronic device 300 (referring to FIG. 1 or FIG. 2), when the stylus 100 presses the touchscreen 310 of the electronic device 300, a location or coordinates of the stylus 100 may be perceived by the electronic device 300. In addition, a wireless signal transmitting module (for example, a Bluetooth module and a WIFI module, which are not shown in the figure) may be disposed on the stylus 100, and is configured to transmit the pressure sensing signal to the electronic device 300. The pressure sensing signal may be used as a parameter used by the electronic device 300 to determine information input by the stylus 100. Based on coordinate information and pressure information, the stylus 100 may implement input in manners such as tapping, drawing lines of different thicknesses, and writing on the touchscreen 310.

In addition to being transmitted by using the wireless signal transmitting module such as Bluetooth or WIFI, the pressure sensing signal may be further sent by using a coding electrode on the stylus 100. To be specific, a coded signal sent by the coding electrode may be used as a signal used by the electronic device 300 to obtain the location and a posture of the stylus 100, and may also include data of the pressure sensing signal (for example, a pressure value).

In some embodiments, if the strain gauge 13a receives a relatively small analog electrical signal, the pressure sensing chip 10a or the main circuit board 10 may include an amplification unit (not shown in the figure) configured to amplify the signal.

In this embodiment, the stylus housing 15 mainly limits an appearance shape of the stylus 100, and is used by an operator for holding, tapping, writing, drawing, or the like. The appearance shape of the stylus housing 15 may be set as required. For example, the stylus housing 15 is roughly rod-shaped, and a cross section of the stylus housing 15 may be square, circular, oval, polygonal, or in another shape.

The stylus tip 16 is located at an end of the stylus housing 15 in an axial direction and may be set to be tapered. An outer surface of a tip end of the stylus tip 16 may be set as a spherical arc-shaped surface to increase smoothness of stylus tip 16 sliding. A radius of the spherical arc-shaped surface at the stylus tip 16 may be set to be relatively small (for example, less than 0.5 mm), to improve and ensure positioning precision of the touchscreen 310.

The pressure sensing module 12 in this embodiment further includes a conducting holder 14, configured to conduct pressure or strain. The conducting holder 14 is disposed in the internal space Q1 of the stylus housing 15, and the pressure strain collection element 13 is installed in a part of the conducting holder 14 close to the main circuit board 10. The stylus tip 16 is located at the end of the stylus housing 15 in the axial direction and is connected to the conducting holder 14, and pressure or strain to which the stylus tip 16 is subject may be conducted to the pressure strain collection element 13 by using the conducting holder 14.

Figure 5:
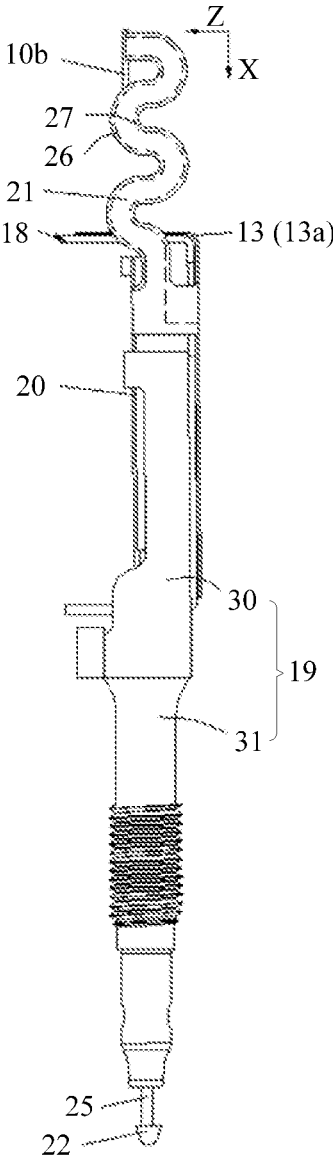
FIG. 5 is a view in a direction A of FIG. 4 (a partial structure is hidden and is not shown)

Referring to FIG. 4 and FIG. 5, in an implementation, the conducting holder 14 includes a pressure sensing spring sheet 18 and a holder member 19.

One end of the holder member 19 is installed with the stylus tip 16 (referring to FIG. 3), the other end of the holder member presses the pressure sensing spring sheet 18 against the stylus housing 15, and the pressure strain collection element 13 is attached to the pressure sensing spring sheet 18, so that pressure or strain to which the stylus tip 16 is subject can be conducted by using the holder member 19, and deform the pressure sensing spring sheet 18, thereby driving deformation of the pressure strain collection element 13.

A specific structure of the holder member 19 in this embodiment may be set as required. For example, referring to FIG. 4-FIG. 6, in this embodiment, the holder member 19 includes a support stand 30 and a main shaft part 31 that are connected along a first direction X (being an axial direction of the stylus). The support stand 30 is spaced from the main circuit board 10 in the first direction X. The main shaft part 31 is located on a side of the support stand 30 away from the main circuit board 10, and the stylus tip 16 is connected to an end of the main shaft part 31 away from the support stand 30.

The support stand 30 has a first end D1 and a second end D2 that are opposite to each other along the first direction X. The support stand 30 has a first side M1 and a second side M2 that are opposite to each other along a second direction Y, and the first side M1 and the second side M2 correspond to two sides of the main circuit board 10 in a width direction. The support stand 30 has a first surface P1 and a second surface P2 that are opposite to each other along a third direction Z. The second direction Y is perpendicular to the first direction X, and the third direction Z is perpendicular to the first direction X and perpendicular to the second direction Y.

The pressure sensing spring sheet 18 is U-shaped and includes a bottom sheet 36, a first side sheet 37, and a second side sheet 38. The pressure sensing spring sheet 18 may be made of a material such as metal, and has a specific elastic deformation capability. The bottom sheet 36 extends along the first direction X; and the first side sheet 37 and the second side sheet 38 respectively extend, in a direction perpendicular to the bottom sheet 36, from two ends of the bottom sheet 36 along the first direction X to connect to the stylus housing 15. The bottom sheet 36 is connected to the second surface P2 of the support stand 30 through fastening. The pressure strain collection element 13 is the strain gauge 13a. The strain gauge 13a is attached to an outer side surface of the pressure sensing spring sheet 18 (being a side surface of the pressure sensing spring sheet 18 away from a bending direction of the first side sheet 37 and the second side sheet 38), and covers two sides of a bending corner between the first side sheet 37 and the bottom sheet 36 and/or two sides of a bending corner between the second side sheet 38 and the bottom sheet 36. Optionally, the strain gauge 13a and the bottom sheet 36 that are stacked may be locked and connected to the second surface P2 of the support stand 30 by using a locking member such as a screw.

In this way, the pressure and the strain to which the stylus tip 16 is subject are conducted to the bottom sheet 36 of the pressure sensing spring sheet 18 by using the holder member 19, so that the bottom sheet 36 is deformed along the axial direction of the stylus 100 (namely, the first direction X). The deformation is disposed in combination with a structure in which end parts of the first side sheet 37 and the second side sheet 38 are connected to the stylus housing 15, so that an included angle between the first side sheet 37/the second side sheet 38 and the bottom sheet 36 changes. Further, the pressure or the strain is conducted to the strain gauge 13a covering the first side sheet 37/the second side sheet 38 and the bottom sheet 36, so that the strain gauge 13a generates a corresponding analog electrical signal.

In this implementation, the strain gauge 13a covers the bending corner between the first side sheet 37 and the bottom sheet 36, and is L-shaped as a whole. In other embodiments, the strain gauge 13a may be U-shaped and extend to cover the bottom sheet 36 and the first side sheet 37 and the second side sheet 38 on the two sides.

In this implementation, the holder member 19 is provided with a via hole K3 on the support stand 30, which allows the second side sheet 38 to pass through. A size of the via hole K3 in the first direction X is greater than a thickness of the second side sheet 38, so that the second side sheet 38 has specific deformation space without being impeded by the holder member 19. One end of the bottom sheet 36 close to the main circuit board 10 extends out of the support stand 30 of the holder member 19, and the first side sheet 37 is connected to an extension end of the bottom sheet 36, so that there is a specific space between the first side sheet 37 and the holder member 19, preventing deformation of the first side sheet 37 from being blocked by the holder member 19.

Figure 6:
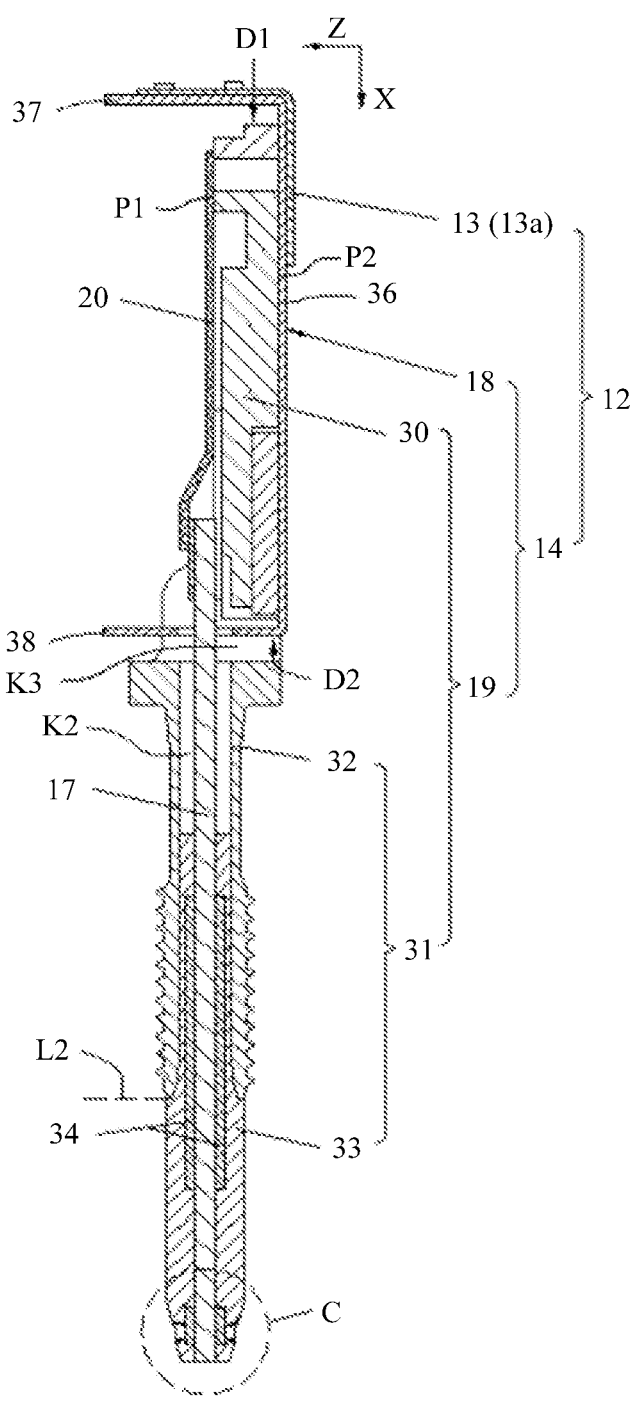
FIG. 6 is a cutaway drawing of FIG. 4 (a partial structure is hidden and not shown)

Mainly referring to FIG. 6, in this implementation, the main shaft part 31 includes a first shaft part 32 and a second shaft part 33. The first shaft part 32 is of a hollow cylindrical structure, and is integrally formed with the support stand 30. One end of the second shaft part 33 is filled inside the first shaft part 32, and the other end of the second shaft part extends out of the first shaft part 32 along the first direction X to a side away from the support stand 30. The first shaft part 32 and the support stand 30 may be integrally formed by using a metal material, and the second shaft part 33 may be formed and connected to the first shaft part 32 in a manner of injection molding.

An end of the second shaft part 33 close to the stylus tip 16 may extend into the stylus tip 16, and is connected to the stylus tip 16 in manners such as bonding and threadedly connecting.

In this structure, the pressure or the strain to which the stylus tip 16 is subject is transferred to the bottom sheet 36 of the pressure sensing spring sheet 18 by using the second shaft part 33, the first shaft part 32, and the support stand 30 of the holder member 19, to implement relative deformation between the bottom sheet 36 of the pressure sensing spring sheet 18 and the first side sheet 37/the second side sheet 38. The deformation is received by the strain gauge 13*a* and converted into an analog electrical signal, and then the analog electrical signal is transferred to the main circuit board 10 by using the first flexible printed circuit 11.

In this embodiment, the first flexible printed circuit 11 includes a first flexible board part 20 and a second flexible board part 21. The first flexible board part 20 is stacked on and connected to the holder member 19. The second flexible board part 21 is led out from the first flexible board part 20 and is connected to the pressure sensing chip 10*a*. An electrical connection lead of the strain gauge 13*a* (which is a power supply lead, a signal lead, or the like of the strain gauge) may be connected to the second flexible board part 21, and is electrically connected to the pressure sensing chip 10*a* by using a conductive circuit on the second flexible board part 21. Optionally, the first flexible board part 20 may be stacked on the first surface P1 of the support stand 30, and is opposite to the second surface P2 on which the strain gauge 13*a* is located, to reduce mutual interference between signals transmitted by a circuit on the first flexible board part 20 and a circuit on the strain gauge 13*a*.

The second flexible board part 21 may be set to a wavy shape.

The first flexible board part 20 and the second flexible board part 21 may be two parts on a flexible printed circuit, and share a same substrate. The first flexible board part 20 may be fastened on the holder member 19 by using a fastener such as a screw N1, or may be bound to the holder member 19.

The strain gauge 13*a* may be electrically connected to the second flexible board part 21 by using an intermediate lap joint structure, and is electrically connected to the main circuit board 10 by using the second flexible board part 21. In another embodiment, the strain gauge 13*a* may alternatively be disposed to share a same flexible substrate with the first flexible printed circuit 11. In this way, a conductive circuit configured to electrically connect the strain gauge 13*a* and the main circuit board 10 may be directly wired in the substrate, and no additional connection contact point needs to be used for pairing an electrical connection, thereby simplifying a structure.

In the known technology, a location corresponding to the second flexible board part 21 is set to a hard board structure, and is used to dispose the pressure sensing chip 10*a*. Consequently, a rigid-flexible board needs to be used to implement signal transmission, and costs are relatively high.

In this embodiment, the first flexible board part 20 and the second flexible board part 21 form a pure flexible printed circuit, and costs are reduced. The pressure sensing chip 10*a* does not need to be disposed on the first flexible board part 20, and only some of electro-static discharge (Electro-Static discharge, ESD, not shown in the figure) needs to be reserved for reducing electrostatic impact.

In addition to being configured to transmit the foregoing pressure sensing signal, the stylus 100 in this embodiment may be further configured to transmit one or more coded signals.

For example, as shown in FIG. 3-FIG. 5, a coding chip 10*c* is disposed on the main circuit board 10 of the stylus 100, and is configured to generate a first coded signal and a second coded signal. Correspondingly, a first coding electrode 22 and a second coding electrode 23 are disposed at an end of the stylus 100 close to the stylus tip 16. The coding chip 10*c* is electrically connected to the first coding electrode 22, to transmit the first coded signal to the first coding electrode 22. The coding chip 10*c* is electrically connected to the second coding electrode 23, to transmit the second coded signal to the second coding electrode 23.

The stylus 16 may be made of a conductive material (for example, a metal or non-metal conductive material), and is used as the first coding electrode 22, or the first coding electrode 22 may be disposed inside the stylus 16. The second coding electrode 23 may be disposed at a location that is on a circumferential surface of the stylus housing 15 and that is close to the stylus tip 16, and is spaced from the first coding electrode 22 in the first direction X. The second coding electrode 23 may be in an annular structure, so that the stylus 100 can turn around to any location, and the second coding electrode 23 can form a capacitor corresponding to the electrode 311 of the touchscreen 310.

In this embodiment, an isolation electrode 24 may be further disposed between the second coding electrode 23 and the first coding electrode 22, and the isolation electrode 24 may also be disposed to be in an annular shape and surround outside the circumferential surface of the stylus housing 15. The isolation electrode 24 is grounded, and is configured to isolate the first coding electrode 22 from the second coding electrode 23, to reduce mutual impact of coded signals of the first coding electrode 22 and the second coding electrode 23.

Certainly, in another embodiment, the isolation electrode 24 may alternatively be omitted, and mutual impact between the first coding electrode 22 and the second coding electrode 23 is reduced in another manner, for example, by increasing a space between the first coding electrode 22 and the second coding electrode 23, or by improving software or hardware to improve identification precision of the electronic device 300. The following exemplarily describes transmission paths of the first coded signal and the second coded signal.

In this embodiment, the stylus 100 further includes a strip-shaped circuit board 17, namely, a long-strip-shaped plate-like structure, on which a conductive circuit is arranged. The first coding electrode 22 is electrically connected to the first flexible printed circuit 11 by using the conductive circuit on the strip-shaped circuit board 17. The coding chip 10*c* on the main circuit board 10 may be electrically connected to the stylus tip 16 by using the first flexible printed circuit 11 and the strip-shaped circuit board 17, to transmit the first coded signal. For ease of description, a conductive circuit that is on the first flexible printed circuit 11 and that is configured to electrically connect the strain gauge 13*a* and the pressure sensing chip 10*a* is defined as a first conductive circuit 26, and a conductive circuit that is on the first flexible printed circuit 11 and that is configured to electrically connect the strip-shaped circuit board 17 and the coding chip 10*c* and configured to transmit the first coded signal is defined as a second conductive circuit 27. Both the first conductive circuit 26 and the second conductive circuit 27 pass through the second flexible board part 21. To reduce mutual interference between the first coded signal and the pressure sensing signal when the first coded signal and the pressure sensing signal are transmitted on the second flexible board part 21, in this embodiment, parts that are of the first conductive circuit 26 and the second conductive circuit 27 and that are on the second flexible board part 21 are spaced from each other along a width direction of the second flexible board part 21, and a relatively large space is maintained. A width of the second flexible board part 21 is perpendicular to an extension direction of the second flexible board part 21.

In addition, in this embodiment, the pressure sensing chip 10a is disposed on the main circuit board 10, and a connection between the strain gauge 13a and the main circuit board 10 needs to pass through the first conductive circuit 26 of the second flexible board part 21. In this case, a wiring path of the pressure sensing signal increases, and a noise risk may be increased. In this embodiment, in addition to the foregoing manners in which the first conductive circuit 26 and the second conductive circuit 27 are spaced relatively large and the isolation electrode 24 is disposed, manners may be used, such as performing four-side grounding protection on the main circuit board 10, reserving a matching capacitor on the main circuit board 10 to filter out interference, and avoiding, through a software design, simultaneous transmission of the first coded signal and the pressure sensing signal, to reduce a risk of the foregoing signal transmission noise or mutual interference.

In some implementations, a pogo pin 25 is disposed between the strip-shaped circuit board 17 and the first coding electrode 22. The pogo pin 25 is electrically connected between the first coding electrode 22 and the strip-shaped circuit board 17, and is configured to transmit the first coding signal.

In some implementations, referring to FIG. 6, a shaft hole K2 along the first direction X may be provided on the foregoing main shaft part 31, and is configured to accommodate the strip-shaped circuit board 17. For example, after passing through an inner hole of the first shaft part 32, the strip-shaped circuit board 17 is poured to form the second shaft part 33 that is connected to the first shaft part 32 and that covers a part of a length of the strip-shaped circuit board 17. Space that is of the second shaft part 33 and that is occupied by the strip-shaped circuit board 17 and the inner hole of the first shaft part 32 together form the foregoing shaft hole K2. This setting structure is compact, and structural rigidity of the strip-shaped circuit board 17 is improved. In addition, in some implementations, a reinforcing strip 34 may be further disposed, and the reinforcing strip 34 is connected to the strip-shaped circuit board 17 through fastening and is wrapped in the second shaft part 33. Disposing the reinforcing strip 34 may further improve bending rigidity of the strip-shaped circuit board 17, and reduce a tendency of bending deformation of the strip-shaped circuit board 17 under compression. Optionally, the reinforcing strip 34 includes steel sheets attached to upper and lower surfaces of the strip-shaped circuit board 17, and crosses, along the first direction X, a boundary L2 of the first shaft part 32 and the second shaft part 33 in the first direction X.

Referring to FIG. 3-FIG. 5 again, in this embodiment, the stylus 100 further includes a second flexible printed circuit 28. The coding chip 10c is electrically connected to the second coding electrode 23 by using the second flexible printed circuit 28, to transmit the second coded signal. The second flexible printed circuit 28 extends, along the first direction X, from the main circuit board 10 to a location of the stylus tip 16 close to the second coding electrode 23. A board-to-board connector may be used to connect the coding chip 10c and the second flexible printed circuit 28.

The second flexible printed circuit 28 is a flexible printed circuit (Flexible Printed Circuit, FPC), which uses polyimide, a polyester film, or another flexible material as a base material, and has a relatively good deformation capability. The second flexible printed circuit 28 and the first flexible printed circuit 11 may be two mutually independent flexible printed circuits, or may be two parts of one flexible printed circuit.

The second flexible printed circuit 28 is disposed as a transmission line of the second coded signal, reducing costs of a solution in which transmission of the second coded signal is implemented by using the rigid-flexible board and the strip-shaped circuit board in some known technologies.

In some implementations, the second flexible printed circuit 28 and the second flexible board part 21 of the first flexible printed circuit 11 are respectively disposed on two sides of a central axis L1 of the stylus 100, and the second flexible board part 21 is located on the first side M1, and the second flexible printed circuit 28 is disposed on the second side M2. For example, as shown in the figure, the second flexible printed circuit 28 and the second flexible board part 21 of the first flexible printed circuit 11 are respectively located on the two sides of the width direction of the main circuit board 10. The width direction of the main circuit board 10 is a direction parallel to a board surface of the main circuit board 10 and perpendicular to the central axis of the stylus 100.

The second flexible printed circuit 28 and the second flexible board part 21 of the first flexible printed circuit 11 are disposed on two sides, so that mutual interference between signals transmitted on the second flexible printed circuit 28 and the first flexible printed circuit 11 can be reduced.

In an implementation in which the isolation electrode 24 is disposed, a ground contact point 29 may be disposed on the strip-shaped circuit board 17 (referring to FIG. 7), and the isolation electrode 24 may be electrically connected to the ground contact point 29 by using a conductive structure.

Figure 7:
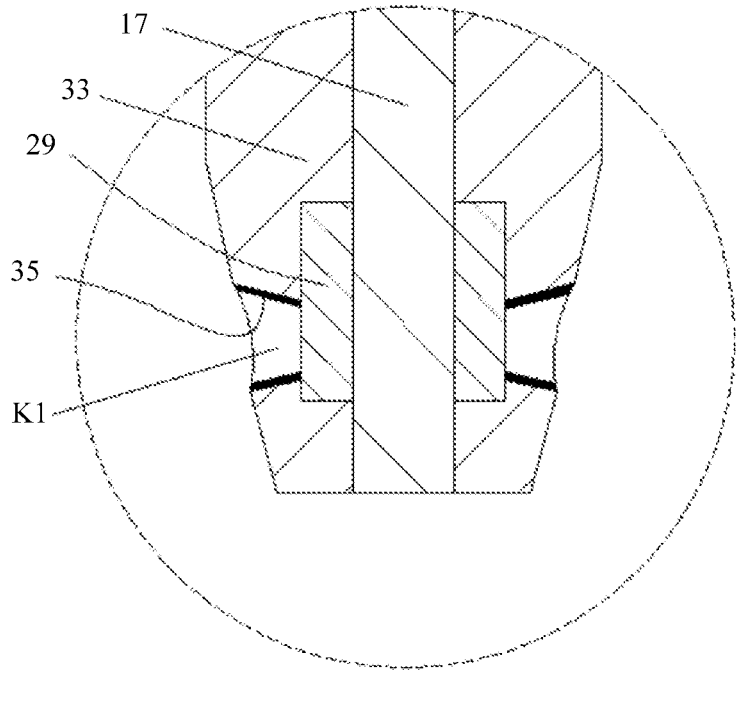
FIG. 7 is an enlarged view of a location C of FIG. 6.

Referring to FIG. 6 and FIG. 7, in some implementations, the ground contact point 29 is disposed on the strip-shaped circuit board 17, and the isolation electrode 24 is disposed on an outer circumference of the stylus housing 15. To implement an electrical connection between the isolation electrode 24 and the ground contact point 29, a communication hole K1 penetrating along a radial direction may be correspondingly opened on the second shaft part 33, and a conduction metal 35 is attached to a hole wall of the communication hole K1. One end of the conduction metal 35 is electrically connected to the ground contact point 29, and the other end of the conduction metal is electrically connected to the isolation electrode 24, so that the isolation electrode 24 is reliably grounded by using the ground contact point of the strip-shaped circuit board 17, to isolate the first coding electrode 22 and the second coding electrode 23. The ground contact point 29 may be connected to a ground end (not shown in the figure) on the main circuit board 10 by using the strip-shaped circuit board 17 and the first flexible printed circuit 11.

When the stylus 100 in this embodiment of this application is used with the electronic device 300, operations such as tapping and sliding may be performed on the touchscreen 310 of the electronic device 300 by using the stylus 100 at a specific inclination angle and by using the stylus tip 16. The pressure or the strain to which the stylus tip 16 is subject is applied to the strain gauge 13a by using the conducting holder 14. After converting the pressure or the strain into the analog electrical signal, the strain gauge 13a transfers the analog electrical signal to the pressure sensing chip 10a and the main circuit board 10s by using the first flexible printed circuit 11, and the pressure sensing chip 10a or the main circuit board 10 converts the analog electrical signal into the digital signal. The digital signal may be transmitted to the electronic device 300 in a wireless or coding manner.

In addition, the stylus 100 may further transmit the first coded signal and the second coded signal by using the first coding electrode 22 and the second coding electrode 23. The first coded signal generated by the coding chip 10c successively passes through the first flexible printed circuit 11, the strip-shaped circuit board 17, the pogo pin 25, and the first coding electrode 22 (located at the stylus tip 16), and then is transmitted, so that the first coded signal is received by the electronic device 300. The second coded signal generated by the coding chip 10c successively passes through the second flexible printed circuit 28 and the second coding electrode 23, and then is transmitted, so that the second coded signal is received by the electronic device 300.

The electronic device 300 may perform corresponding operations based on the received first coded signal, second coded signal, and pressure sensing signal.

With reference to the foregoing description, a structure of the stylus 100 in the embodiments of this application is compact and proper, and the flexible printed circuit is used to replace the rigid-flexible board or another complex structure to transmit the pressure sensing signal and some of the coded signals. Therefore, the structure is simple, costs are relatively low, and product competitiveness is improved.

The foregoing implementations are merely intended to describe the technical solutions of this application, but not intended to constitute any limitation. Although this application is described in detail with reference to the foregoing preferred implementations, a person of ordinary skill in the art should understand that modifications or equivalent replacements can be made to the technical solutions of this application, without departing from the scope of the technical solutions of this application.

What is claimed is:

1. A stylus, comprising:
   a main circuit board, wherein the main circuit board comprises a pressure sensing chip;
   a pressure sensing module, wherein the pressure sensing module comprises a pressure strain collection element;
   a first flexible printed circuit, wherein a first end of the first flexible printed circuit is electrically connected to the pressure strain collection element, and a second end of the first flexible printed circuit is electrically connected to the main circuit board, and the first flexible printed circuit is configured to enable communication between the pressure sensing chip and the pressure strain collection element; and
   a stylus tip and a stylus housing;
   wherein the stylus housing limits internal space;
   wherein the pressure sensing module further comprises a conducting holder, the conducting holder is disposed in the internal space, and the pressure strain collection element is installed on the conducting holder; and
   wherein the stylus tip is located at an end of the stylus housing in an axial direction and is connected to the conducting holder, and pressure or strain to which the stylus tip is subject is capable of being conducted to the pressure strain collection element by using the conducting holder.

2. The stylus according to claim 1, wherein the main circuit board comprises a board-to-board connector electrically connected to the pressure sensing chip, and the first flexible printed circuit is connected to the main circuit board by using the board-to-board connector, to implement communication between the pressure strain collection element and the pressure sensing chip.

3. The stylus according to claim 1, wherein the conducting holder comprises a holder member and a pressure sensing spring sheet; and a first end of the holder member is installed with the stylus tip, a second end of the holder member presses the pressure sensing spring sheet against the stylus housing, and the pressure strain collection element is attached to the pressure sensing spring sheet, wherein pressure or strain to which the stylus tip is subject is capable of being conducted by using the holder member, and deforming the pressure sensing spring sheet, thereby driving deformation of the pressure strain collection element.

4. The stylus according to claim 3, wherein the pressure sensing spring sheet is U-shaped and comprises a bottom sheet, a first side sheet, and a second side sheet; the bottom sheet extends along a first direction, and the first direction is an axial direction of the stylus; and the first side sheet and the second side sheet respectively extend, in a direction perpendicular to the bottom sheet, from two ends of the bottom sheet along the first direction to connect to the stylus housing; the bottom sheet is connected to the holder member through fastening; and the pressure strain collection element is a strain gauge, and the strain gauge is attached to an outer side surface of the pressure sensing spring sheet and covers two sides of a bending corner between the first side sheet and the bottom sheet and/or two sides of a bending corner between the second side sheet and the bottom sheet.

5. The stylus according to claim 3, wherein the holder member comprises a support stand and a main shaft part, the support stand is spaced from the main circuit board along a first direction, and the first direction is an axial direction of the stylus; and the main shaft part is connected to an end of the support stand away from the main circuit board and is connected to the stylus tip; the first flexible printed circuit comprises a first flexible board part and a second flexible board part, the first flexible board part is attached to and installed on the support stand, and the second flexible board part is led out from the first flexible board part and connected to the main circuit board; and the pressure strain collection element is a strain gauge, and the strain gauge is electrically connected to the main circuit board by using the second flexible board part.

6. The stylus according to claim 5, wherein a first coding electrode is disposed at the stylus tip; a coding chip is disposed on the main circuit board, and the coding chip is capable of generating a first coded signal; the coding chip is electrically connected to the first coding electrode, to transmit the first coded signal to the first coding electrode; and the stylus further comprises a strip-shaped circuit board; and the strip-shaped circuit board extends along the first direction, one end of the strip-shaped circuit board is electrically connected to the second flexible board part, and the other end of the strip-shaped circuit board extends to the stylus tip and is electrically connected to the first coding electrode, to transmit the first coded signal.

7. The stylus according to claim 6, wherein
the main shaft part has a shaft hole penetrating along the first direction; and a part of the strip-shaped circuit board is accommodated in the shaft hole, and a part of the strip-shaped circuit board extends out of the shaft hole, is supported on the support stand, and is electrically connected to the second flexible board part.

8. The stylus according to claim 7, wherein
the main shaft part comprises a first shaft part and a second shaft part;
the first shaft part is of a hollow cylindrical structure, and is integrally formed with the support stand; and the strip-shaped circuit board penetrates the first shaft part; and
a first end of the second shaft part is filled inside the first shaft part, a second end of the second shaft part extends out of the first shaft part along the first direction to a side away from the support stand, and the second shaft part wraps a part of the strip-shaped circuit board.

9. The stylus according to claim 8, wherein
the stylus further comprises a reinforcing strip, wherein the reinforcing strip is connected to the strip-shaped circuit board through fastening and is wrapped in the second shaft part.

10. The stylus according to claim 7, wherein
the support stand has a first end and a second end that are opposite to each other along the first direction; the first end is a closest end of the support stand to the main circuit board, and the second end is a farthest end of the support stand from the main circuit board; the support stand has a first side and a second side that are opposite to each other along a second direction, and the support stand has a first surface and a second surface that are opposite to each other along a third direction; and the second direction is perpendicular to the first direction, and the third direction is perpendicular to the first direction and perpendicular to the second direction.

11. The stylus according to claim 10, wherein
the first flexible board part is stacked on the first surface; and
the second flexible board part is located on the first side of the support stand, a board surface of the first flexible board part is parallel to a board surface of the main circuit board, and a board surface of the second flexible board part is perpendicular to the board surface of the main circuit board.

12. The stylus according to claim 11, wherein
the second flexible board part comprises a first conductive circuit and a second conductive circuit;
the first conductive circuit is configured to transmit the first coded signal, the second conductive circuit is configured to transmit a pressure sensing signal, and the pressure sensing signal is an analog electrical signal generated by the strain gauge under an action of pressure or strain from the stylus tip; and
the first conductive circuit and the second conductive circuit are spaced from each other along a width direction of the second flexible board part, and the width direction of the second flexible board part is perpendicular to an extension direction of the second flexible board part.

13. The stylus according to claim 6, wherein
the stylus further comprises a pogo pin;

the pogo pin is supported between the first coding electrode and the main shaft part; and
the pogo pin is electrically connected to the first coding electrode and the strip-shaped circuit board, to transmit the first coded signal.

14. The stylus according to claim 1, wherein
the stylus further comprises a first coding electrode; and
a coding chip is disposed on the main circuit board, and the coding chip is capable of generating a first coded signal; and the coding chip is electrically connected to the first coding electrode, to transmit the first coded signal to the first coding electrode.

15. The stylus according to claim 14, wherein
the stylus further comprises a second coding electrode, and the second coding electrode is spaced from the first coding electrode; and
the coding chip is capable of generating a second coded signal; and the coding chip is electrically connected to the second coding electrode, to transmit the second coded signal to the second coding electrode.

16. The stylus according to claim 15, wherein
the stylus further comprises a second flexible printed circuit; and
the second coding electrode is electrically connected to the coding chip by using the second flexible printed circuit.

17. The stylus according to claim 16, wherein
the second flexible printed circuit and the first flexible printed circuit are two mutually independent flexible printed circuits, or are two parts of one flexible printed circuit.

18. The stylus according to claim 15, wherein
the stylus further comprises an isolation electrode, and the isolation electrode is grounded; and
the isolation electrode is located between the second coding electrode and the first coding electrode.

19. An electronic device assembly, wherein the electronic device assembly comprises an electronic device and a stylus; and
the electronic device comprises a touchscreen, and the stylus is coupled to the touchscreen and is used as an input device of the electronic device; and
wherein the stylus comprises:
a main circuit board, wherein the main circuit board comprises a pressure sensing chip;
a pressure sensing module, wherein the pressure sensing module comprises a pressure strain collection element;
a first flexible printed circuit, wherein a first end of the first flexible printed circuit is electrically connected to the pressure strain collection element, and a second end of the first flexible printed circuit is electrically connected to the main circuit board, and the first flexible printed circuit is configured to enable communication between the pressure sensing chip and the pressure strain collection element; and
a stylus tip and a stylus housing;
wherein the stylus housing limits internal space;
wherein the pressure sensing module further comprises a conducting holder, the conducting holder is disposed in the internal space, and the pressure strain collection element is installed on the conducting holder; and
wherein the stylus tip is located at an end of the stylus housing in an axial direction and is connected to the conducting holder, and pressure or strain to which the stylus tip is subject is capable of being conducted to the pressure strain collection element by using the conducting holder.

20. The electronic device assembly according to claim 19, wherein the main circuit board comprises a board-to-board connector electrically connected to the pressure sensing chip, and the first flexible printed circuit is connected to the main circuit board by using the board-to-board connector, to implement communication between the pressure strain collection element and the pressure sensing chip.

* * * * *